United States Patent
Rumsey

(10) Patent No.: US 9,470,342 B2
(45) Date of Patent: Oct. 18, 2016

(54) THROUGH-WALL PROTECTION DEVICE

(75) Inventor: Roger L. Rumsey, Wichita, KS (US)

(73) Assignee: PAIGE ELECTRIC COMPANY, Union, NJ (US)

( * ) Notice: Subject to any disclaimer, the term of this patent is extended or adjusted under 35 U.S.C. 154(b) by 0 days.

(21) Appl. No.: 13/289,166

(22) Filed: Nov. 4, 2011

(65) Prior Publication Data
US 2012/0110780 A1 May 10, 2012

Related U.S. Application Data

(60) Provisional application No. 61/410,393, filed on Nov. 5, 2010.

(51) Int. Cl.
F16L 5/00 (2006.01)

(52) U.S. Cl.
CPC *F16L 5/00* (2013.01); *Y10T 16/05* (2015.01); *Y10T 29/49838* (2015.01)

(58) Field of Classification Search
CPC ... Y10T 16/05; Y10T 16/063; Y10T 16/088; Y10T 29/49838; F16L 5/00; H02G 3/083; H02G 3/22; B60R 16/0222; H01B 17/583
USPC ............ 16/2.1, 2.2, 2.5; 174/650, 660, 663, 174/668, 669, 152 G, 153 G; 248/56; 29/433
See application file for complete search history.

(56) References Cited

U.S. PATENT DOCUMENTS

| | | | | |
|---|---|---|---|---|
| 2,209,274 | A * | 7/1940 | Jaberg | H02G 3/06 138/96 R |
| 5,069,586 | A * | 12/1991 | Casey | 411/339 |
| 5,079,389 | A * | 1/1992 | Nelson | 174/505 |
| 5,285,013 | A | 2/1994 | Schnell et al. | |
| 5,983,450 | A | 11/1999 | Pratt | |
| 6,335,488 | B1 | 1/2002 | Gretz | |
| 6,682,355 | B1 | 1/2004 | Gretz | |
| 6,872,886 | B2 * | 3/2005 | Kiely | H02G 3/0691 16/2.1 |
| 7,432,452 | B2 * | 10/2008 | Gardner | 174/650 |
| 7,494,157 | B1 | 2/2009 | Kiely | |
| 7,635,816 | B1 | 12/2009 | Shemtov | |
| 2009/0242270 | A1 | 10/2009 | Rumsey | |
| 2010/0307816 | A1 | 12/2010 | Hurrell et al. | |
| 2012/0297572 | A1 * | 11/2012 | Stewart | H02G 3/22 16/2.2 |

* cited by examiner

Primary Examiner — William Miller
(74) Attorney, Agent, or Firm — Cook Alex Ltd.

(57) ABSTRACT

This disclosure relates to a through-wall protection device which provides a passageway through a structure and to an aperture in a housing. The through-wall protection device includes an elongated tube and a bushing with a proximal opening, a distal opening and a bore connecting the openings. The elongated tube and bushing may be locked together using complementary engaging structures which prevent the elongated tube from being removed from within the bore of the bushing. The present disclosure also relates to a method of defining a protected passageway through a structure using the through-wall protection device described herein.

6 Claims, 3 Drawing Sheets

THROUGH-WALL PROTECTION DEVICE

CROSS REFERENCE TO RELATED APPLICATION

This application claims the benefit of U.S. Provisional Application Ser. No. 61/410,393, filed Nov. 5, 2010, which is hereby incorporated by reference in its entirety.

FIELD OF THE DISCLOSURE

The present disclosure generally relates to a protection device wherein a protected passageway communicates with a housing. More specifically, the present disclosure relates to a through-wall protection device wherein a protected passageway is defined through a structure, such as a wall, and into an electrical device or a junction box associated with an electrical device. The passageway of the through-wall protection device is suitable for carrying cables, wires and the like for the electrical device.

BACKGROUND

Often times, there is a need for electrical wires, cables, or any other connective member (which will be referred to collectively herein as wires) to stretch from one side of a structure, such as a wall, to the other side. In some scenarios, it is required, necessary or useful to protect the wires from damage as they pass through the wall or while they are in the wall. For example, wires are often passed through conduit or piping within walls so that the conduits protect the wires from water or moisture, pests, or other conditions that might damage the wires or otherwise interfere with transmissions along the wires.

In the electrical trade through-wall protection devices are known for providing a protected passageway for wires, and any other element that must pass through a wall or other structure in order to connect to an electrical device. For example, see U.S. Pat. No. 5,983,450 and U.S. Publication No. 2009/0242270. In use, these through-wall devices are connected directly to an electrical device or a junction box associated with the electrical device. The through-wall device defines a protected passageway which allows the wires associated with an electrical device located on one side of a wall to be passed from that electrical device to a location on the other side of the wall. Typically, these passageways are created by metal threaded pipes or conduits.

Once in the field, an installer is required to cut the conduit to appropriate size and connect the conduit to the electrical device or junction box associated therewith using lock nuts to form a solid connection between the parts. The entire process is time consuming and somewhat cumbersome since it requires threading and properly positioning multiple lock nuts onto the pipe or conduit. Alternatively, an installer could connect the pipe or conduit using liquid tight fittings, which are commonly known in the art but are expensive and complicated to use.

These prior art through-wall protection devices are made of numerous parts which are time-consuming to assemble, and/or which can be difficult to properly install. Therefore, there is a need for providing a through-wall protection device that is easy to install and is relatively inexpensive. In addition, through-wall protection devices may be used in connection with a variety of different structures each with varying thickness and characteristics. In this regard, conventional through-wall protection devices require an installer to measure and cut each conduit to the necessary size. The required manual labor for installation of conventional through-wall protection devices takes time and adds significant expense.

The present disclosure relates to improvements in conventional through-wall protection devices and methods of use in order to address the issues noted above.

SUMMARY

The subject matter disclosed herein is directed in a first aspect to a through-wall protection device which provides a passageway through a structure and to an aperture in a housing. The through-wall protection device includes an elongated tube and a bushing with a proximal opening, a distal opening and a bore connecting the openings. The elongated tube and bushing may be locked together using complementary engaging structures which prevent the elongated tube from being removed from within the bore of the bushing. In another aspect the present disclosure relates to a method of defining a protected passageway through a structure using the through-wall protection device described herein.

Disclosed herein are through-wall protection devices having an elongated tube that selectively engages a bushing that is associated with a housing and more specifically an opening in the housing. Preferably at least a portion of the elongated tube is positioned within the bushing and together the elongated tube and the bushing define a passageway into the housing. The tube and bushing preferably have cooperating engaging elements which interact to selectively connect or lock the elongated tube and bushing together.

The housing into which the through-wall protection device provides a passageway may be any sort of structure that receives wires. For example, the housing may be an electrical device or a junction box that is associated with an electrical device. More specifically, the device could be a television, lighted sign, or telephone. It will be appreciated that any other sort of device that requires cabling or wiring may be used in connection with the through-wall protection device according to the present disclosure.

The elongated tube allows the passageway to extend through any number of structures. For example, the device may be used to provide a passageway through a structure such as a wall of a house or building. The elongated tube may be sized to extend through any structure such that it provides a passageway through the structure. Accordingly, if the structure is one foot thick, the elongated tube may be at least one foot long in order to extend through the structure. Alternatively, the elongated tube could be less than the thickness of the structure for certain scenarios, for example, if the wires carried by the structure were going to be directed somewhere within the structure itself. In order to allow easy installation, the elongated structure could be available in standard pre-selected sizes.

Detailed embodiments of the present disclosure are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
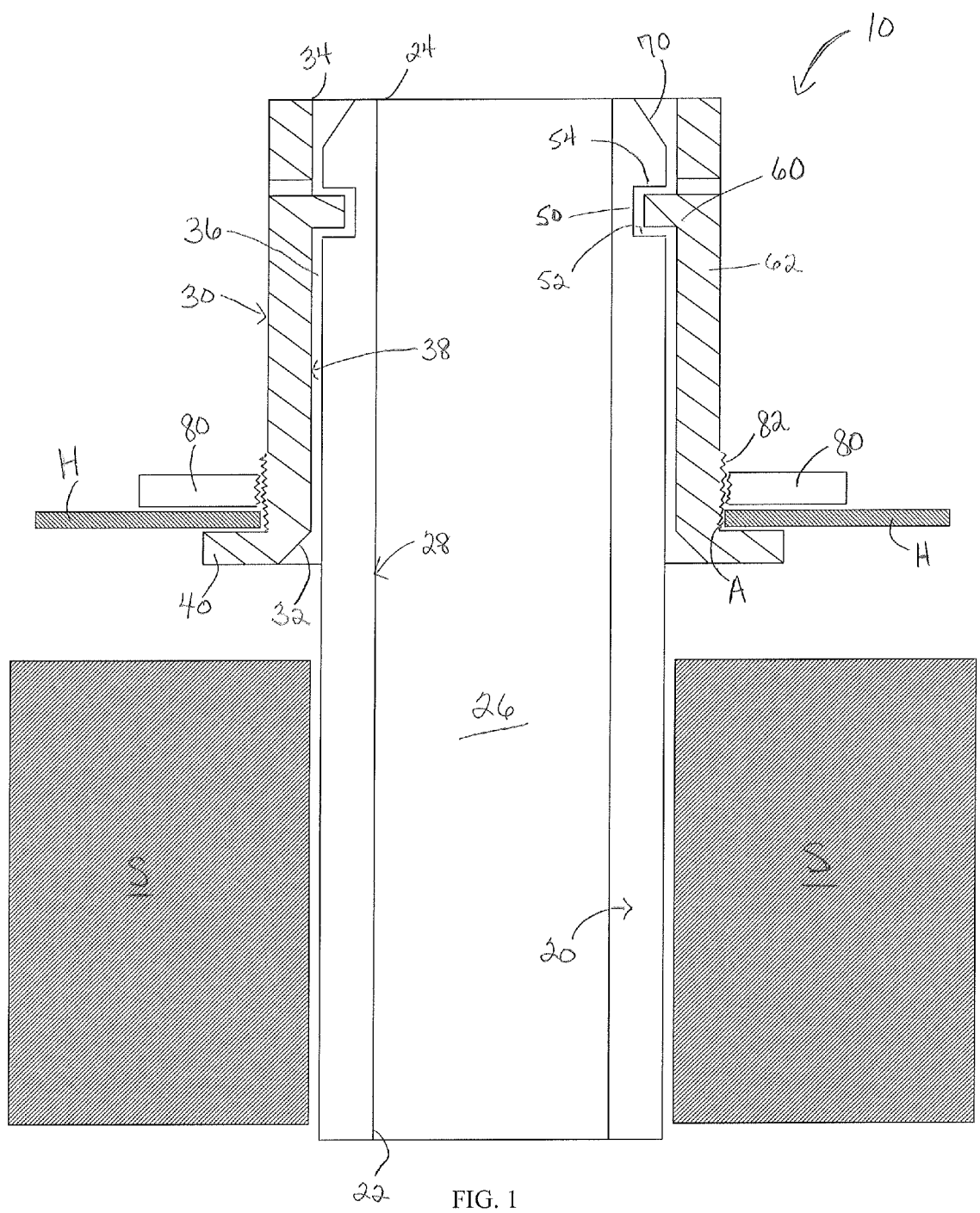
FIG. 1 is a cross-sectional view of one embodiment of a through-wall protection device according to the present disclosure.

Corresponding reference numerals indicate corresponding parts throughout the several views. Although the drawings represent exemplary embodiments of the present disclosure, the drawings are not necessarily to scale and certain features may be exaggerated to better illustrate and explain the present disclosure.

DETAILED DESCRIPTION

FIG. 1 illustrates one embodiment of a through-wall protection device 10 in one conventional application with structure "S", such as a wall, and housing "H", such as a junction box or other electrical enclosure for use with an electrical device. This illustrated application of the through-wall protection device is only one example and it should be appreciated that device 10 has a vast number of applications and can be used in a variety of environments.

Figure 2:
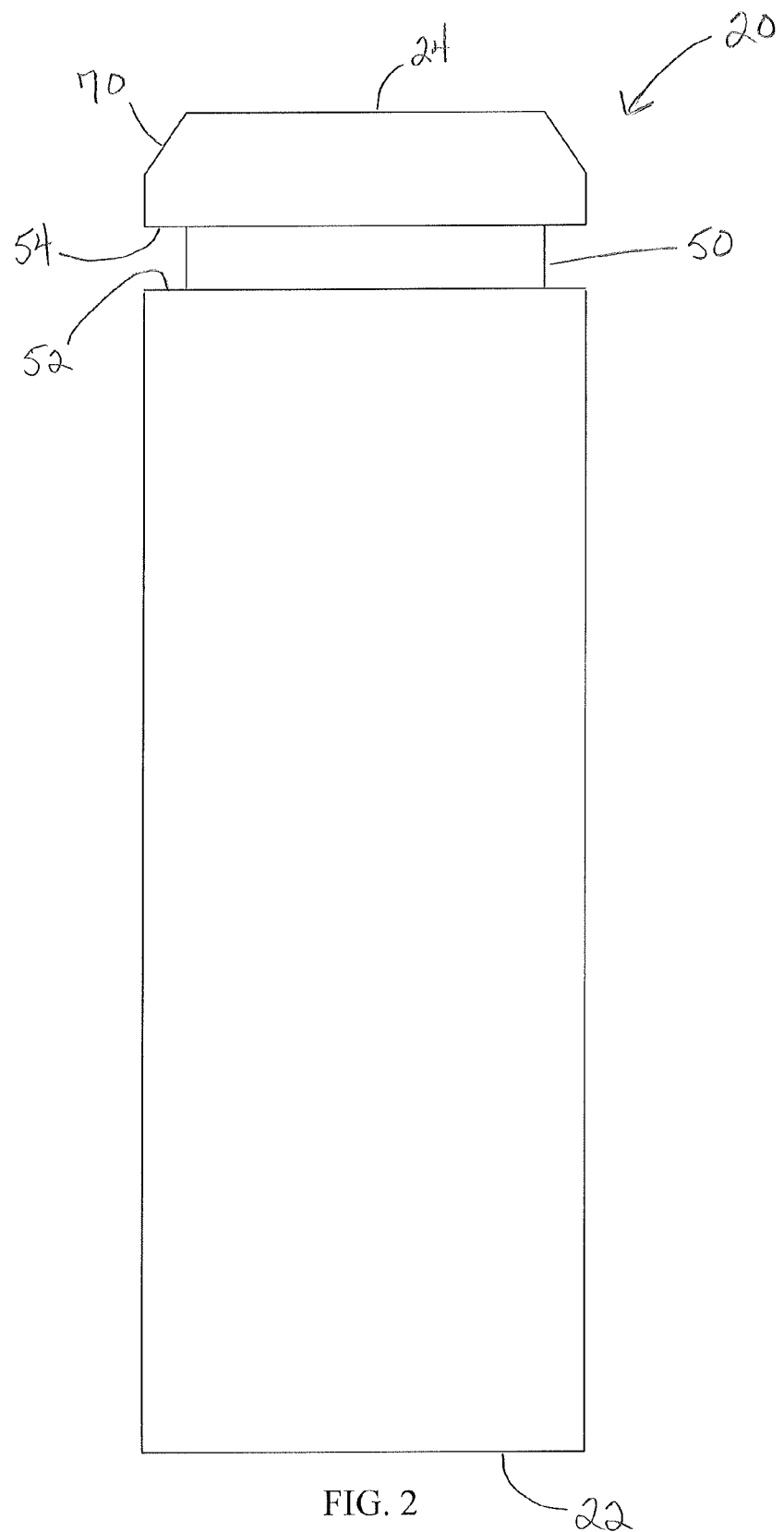
FIG. 2 is a side elevation view of the elongated tube of the through-wall protection device of FIG. 1.

Generally, through-wall protection device 10 of the present disclosure includes an elongated tube 20 and a bushing 30. As best illustrated in FIG. 2, the elongated tube 20 has a distal opening 22 and a proximal opening 24. The openings 22 and 24 are in communication with one another via a bore 26 (FIG. 1), which is defined by sidewall 28 of the elongated tube 20. In the illustrated embodiment the elongated tube is cylindrical; however, it will be understood that the elongated tube could have other cross-sectional shapes. The elongated tube 20 may be constructed of any material that can substantially protect the wires positioned therewithin from damage during the normal course of use. In addition, the material must possess a sufficient stiffness that allows it to support its elongated form. In the illustrated embodiment, the elongated tube is constructed of plastic and more specifically, polyvinyl chloride (PVC). However, it will be appreciated that other materials or combination of materials may be used, and not depart from the spirit and scope of the present disclosure.

The length of the sidewall 28 is sufficient to pass through the thickness of the desired structure S and into engagement with the bushing 30. The internal dimension of the bore 26 (which would be its internal diameter in the case of a cylindrical tube) is sufficient to receive the wires or other items that may be passed through the passageway of the bore and into the housing H. In the illustrated embodiment, the bore 26 has a diameter of about 0.39 inches and a length of about 16 inches. However, it will be understood that the elongated tube may be sized such that it does not necessarily pass entirely through the structure "S".

Figure 3:
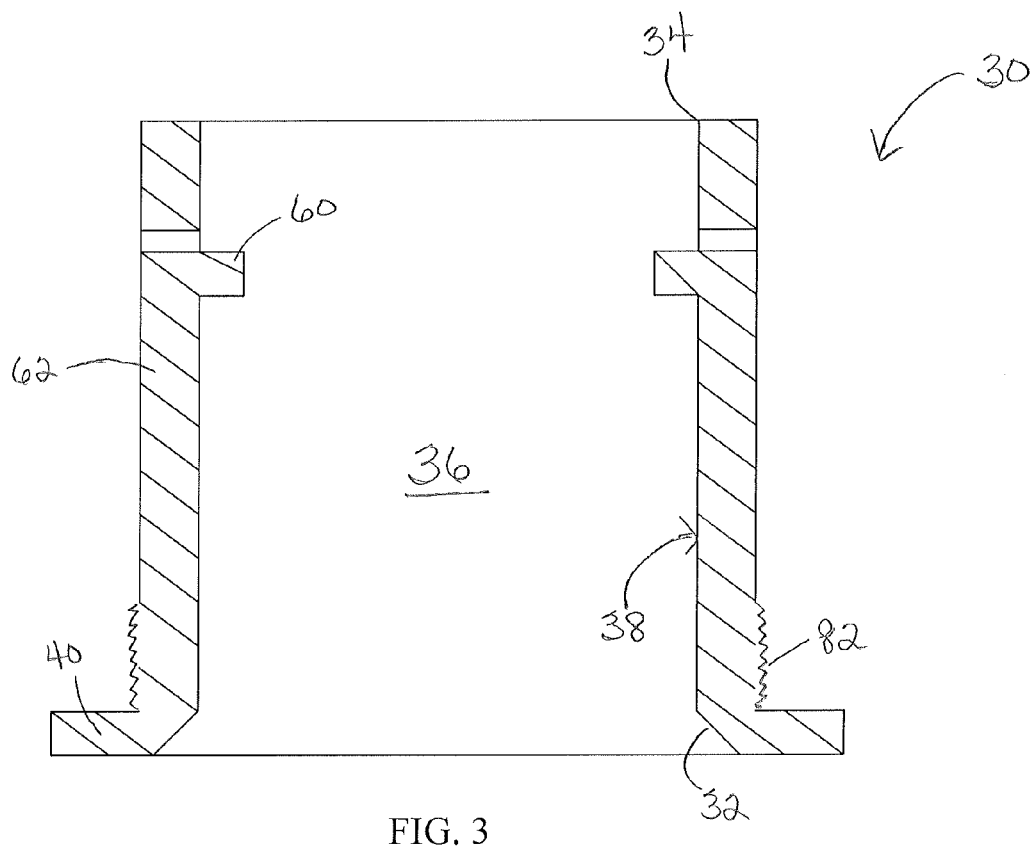
FIG. 3 is a cross-sectional view of the bushing of the through-wall protection device of FIG. 1.

As best illustrated in FIG. 3, the bushing 30 has a distal opening 32 and a proximal opening 34. As with the elongated tube 20, the openings of the bushing 30 are in communication with one another by a bore 36 which is defined by sidewall 38. At least a portion of the bushing 30 is sized to fit within aperture "A" of housing "H" such that the bushing provides a pathway into the housing. In the illustrated embodiment, the bushing 30 includes a flange 40 which is positioned at the bushing's distal opening 32. It will be appreciated that the flange 40 could be positioned elsewhere along the length of the bushing, for example, the flange could be spaced from the distal opening 32. The flange 40 is sized such that it prevents the bushing 30 from being passed entirely through aperture "A" of housing "H".

In addition the bore 36 of the bushing 30 is sized to receive at least a portion of the elongated tube 20. In the illustrated embodiment the bore 36 has a diameter of about 0.565 inches. In the illustrated embodiment, the bushing 30, and more specifically the bore 36, is cylindrical in order to be complimentary to the shape of the outer surface of the sidewall of the elongated tube 20; however, as mentioned above, the bore 36 could have other cross-sectional shapes. The bushing 30 is constructed of a material that can protect the wires from damage from typical wear and tear. In the illustrated embodiment, the bushing is constructed of plastic and more specifically, PVC. However, it will be appreciated that other materials may be used, or a combination of materials may be used, and not depart from the spirit and scope of the present disclosure.

In order to selectively connect the elongated tube 20 and the bushing 30, these two pieces have complementary engaging structures. In the illustrated embodiment the elongated tube includes a notch 50 and the bushing includes projections 60. The notch 50 and projections 60 are sized and configured such that they tightly engage one another and substantially prevent withdrawal of the elongated tube from the bushing once engaged or in the locked position. While the illustrated embodiment discloses the notch 50 being formed on the elongated tube 20 and the projections 60 on the bushing 30; it will be appreciated that the structures could be reversed such that the notch is on the bushing and the projection is on the elongated tube. Alternatively, other complementary engaging structures could be incorporated and not depart from the spirit and scope of the present disclosure.

In the illustrated embodiment, the notch 50 of the elongated tube is a groove which is formed towards the proximal end of the elongated tube 20 and interacts with the flexible projections 60 once the elongated tube 20 nears its full insertion or locked position within the bore 36 of the bushing 30. The groove has a first wall 52 and a second wall 54 which each extend substantially perpendicularly to the tube's sidewall 28. The orientation of the first and second walls 52 and 54 of the notch 50 prevents projections 60 from sliding out of engagement with the notch 50. In the illustrated embodiment, the notch 50 extends fully around the circumference of the elongated tube 20; however, it will be appreciated that other notch configurations may be used, for example multiple, spaced or segmented notches could be positioned around the elongated tube, and not depart from the spirit and scope of the invention.

Figure 4:
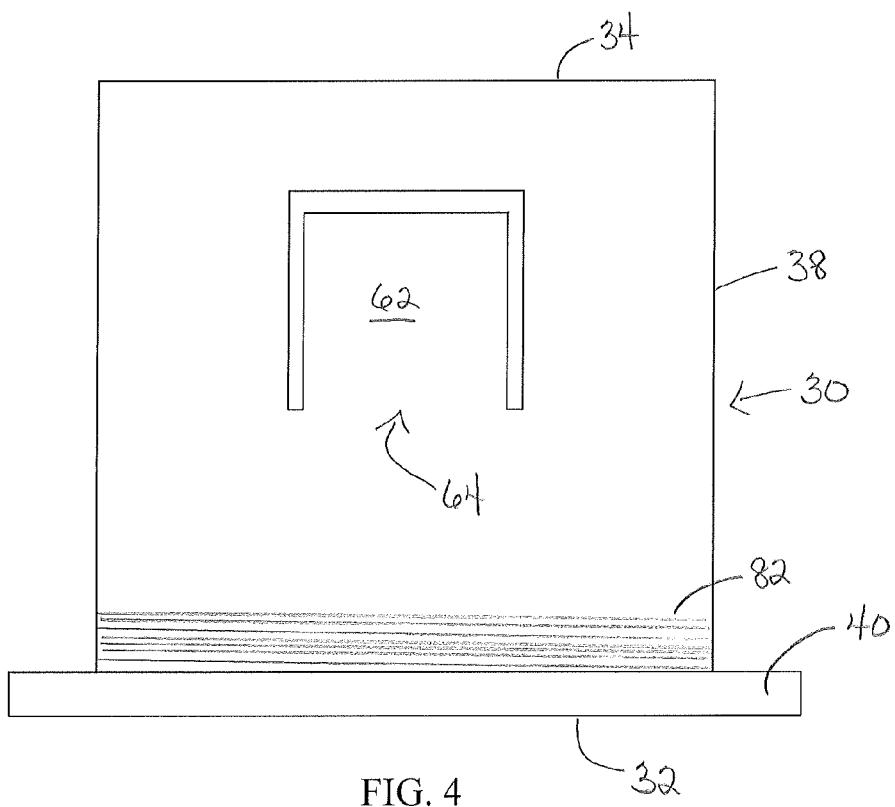
FIG. 4 is a side elevation view of the bushing of the through-wall protection device of FIG. 1.

As best illustrated in FIGS. 3 and 4, each projection 60 is attached to an end of a flexible finger 62 and extends into the bore 36 of the bushing 30. The finger 62 is defined in the sidewall 38 of the bushing 30. More specifically, the finger 62 may be integrally formed in the sidewall 38 by cutting along three sides of the finger 62 with the fourth side remaining attached at the end of the finger, as indicated at 64. This allows the finger 62 to pivot about its end 64. During advancement of the elongated tube into the bushing, the finger 62 pivots or flexes from an initial, rest position, to a biased position and then back to the initial position. The illustrated embodiment includes two fingers 62 with projections 60; however, it will be appreciated that additional fingers with projections may be included or additional projections on each finger may also be included and not depart from the spirit and scope of the present disclosure. A further alternate would be to make the finger a separate piece that is suitably attached to the bushing sidewall 38.

The elongated tube 20 includes a deflector 70 at or near the proximal end which interacts with projection 60 in order to deflect the finger 62 radially outwardly until the projection 60 can be positioned within the groove 50 of the elongated tube 20. More specifically, in the illustrated embodiment the deflector 70 is a tapered or sloped end of the elongated tube 20. This configuration allows the tapered end of the elongated tube to gradually deflect the projection, and ultimately the finger, radially outwardly to the biased position as the elongated tube is advanced into the bore 36 of the bushing 30. As the elongated tube is continually advanced within the bushing's bore, the projection slides along the outer wall of the elongated tube until it is opposite the groove 50 which allows the finger to deflect or snap back to its initial position and lock the elongated tube and bushing together.

In order to attach the through-wall protection device to the housing H, at least a portion of the outer surface of the bushing 30 is threaded at 82 such that it can engage a ring member 80. In the illustrated embodiment the ring member 80 is a lock nut with an internal threaded portion for engaging the threaded outer portion 82 of the bushing 30.

Preferably, the use and operation of the device are as follows. The bushing is positioned through an aperture "A" in a housing "H" such that flange 40 of the bushing 30 abuts against a wall or surface of the housing "H". Lock nut 80 is then threaded onto bushing 30 and tightened up against the wall of the housing "H" such that the wall is clamped between flange 40 and lock nut 80. With the bushing 30 attached or otherwise connected or locked onto the housing "H", elongated tube 20 is advanced through the surface "S" and introduced into bore 36 of bushing 30. As elongated tube 20 is advanced, tapered end 70 biases projections 60 radially outwardly until the projections 60 snap into locking engagement with groove 50 of elongated tube 20. When through-wall protection device 10 is in this configuration, first and second walls 52 and 54 of the groove 50 prevent the elongated tube 20 from being further advanced or withdrawn from bushing 30.

It will be appreciated that the order of the assembly steps could be altered. For example, the elongated tube 20 could be passed through the wall or structure "S" either before or after it is attached to bushing 30 and housing "H". At some point in the assembly process after securement of the bushing 30 to the housing "H", the housing may be attached to the wall or surface "S". Once assembled, the bushing 30 and elongated tube 20 define a protected passageway for wires passing through a wall or structure "S and into housing "H" of an electrical device or housing associated with an electrical device. The wires could be fed through the device at any number of points during the installation process. Although it could be otherwise, in a typical situation the electrical device has wires inside the housing "H" which are fed from the housing through the elongated tube 20 for connection to supply lines on the other side of the wall or surface "S". In this instance it may be preferable to feed the wires before all of the pieces are connected and more preferably before the elongated tube 20 and bushing 30 are attached to one another. Likewise, the housing "H" may be attached to the wall or surface "S" after feeding the wires from the housing "H" through the device 10. It will be understood that alternatively, the wires could be fed from the back side of the surface "S" into and through the protection device 10 and into the housing "H" for connection to the electrical device.

It will be further understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For example, the bushing could also includes a stop which prevents the elongated tube from being passed through the proximal opening 34 of the bushing. The stop may be a lip or projection positioned near the proximal opening which extends radially into the bore. Alternatively, the bore of the bushing, and more specifically at the proximal end, could be sized and configured to prevent the elongated tube from passing through the proximal opening. For these reasons, the scope hereof is not limited to the above description but is as set forth in the following claims, and it is understood that claims may be directed to the features hereof, including as combinations of features that are individually disclosed or claimed herein.

I claim:

1. A through-wall protection device which provides a passageway for wires into a housing, the device comprising:
   a bushing having a sidewall which defines an axis, a proximal opening, a distal opening and a bore connecting the openings and the bushing further including a flange extending substantially perpendicularly from said sidewall of the bushing and sized and configured to abut against a wall of the housing; and
   an elongated tube selectively positioned within the bore of the bushing, the elongated tube comprising a sidewall defining a bore sized and configured to receive the wires, the bore having an axis and the elongated tube having a length such that when installed the tube extends axially past the bushing flange on a first side of the bushing flange and extends axially past the bushing flange on a second side of the bushing flange and out of the bushing;
   wherein the bushing includes at least one of a projection or a notch and the elongated tube includes at least one of the other of the projection or notch, the projection extending perpendicularly to the axis of said bushing or tube in which it is formed, the notch being defined by facing first and second walls extending perpendicularly to the axis of said bushing or tube in which said first and second walls are formed and wherein the at least one projection is attached to a flexible finger defined in the bushing and wherein when the elongated tube is advanced into the bore of the bushing to a point where the projection and notch are aligned with one another, the projection moves in between the first and second walls to connect the bushing and elongated tube to one another, the interaction of the projection and notch being such that once they engage the projection cannot slide out of the notch and the elongated tube cannot be moved relative to the bore of the bushing in either an advancing or a retracting direction.

2. The device of claim 1 wherein the elongated tube includes a deflector.

3. The device of claim 1 wherein the at least one notch comprises at least one groove formed in the sidewall of the elongated tube.

4. The device of claim 3 wherein the at least one groove comprises said first and second walls which are spaced from one another and extend substantially perpendicularly to the sidewall of the elongated tube.

5. The device of claim 1 wherein the flexible finger is defined in said sidewall of the bushing.

6. A through-wall protection device which provides a passageway for wires into a housing, the device comprising:

a bushing having a sidewall which defines an axis, a proximal opening, a distal opening and a bore connecting the openings and the bushing further including a flange extending substantially perpendicularly from said sidewall of the bushing and sized and configured to abut against a wall of the housing; and an elongated tube selectively positioned within the bore of the bushing, the elongated tube comprising a sidewall defining a bore sized and configured to receive the wires, the bore having an axis and the elongated tube having a length such that when installed the tube axially overlaps the bushing flange and extends axially past the bushing flange and out of the bushing;

wherein the bushing includes at least one of a projection or a notch and the elongated tube includes at least one of the other of the projection or notch, the projection extending perpendicularly to the axis of said bushing or tube in which it is formed, the notch being defined by facing first and second walls extending perpendicularly to the axis of said bushing or tube in which said first and second walls are formed and wherein when the elongated tube is advanced into the bore of the bushing to a point where the projection and notch are aligned with one another, the projection moves in between the first and second walls to connect the bushing and elongated tube to one another, the interaction of the projection and notch being such that once they engage the projection cannot slide out of the notch and the elongated tube cannot be moved relative to the bore of the bushing in either an advancing or a retracting direction; and a deflector formed on an end of the one of the bushing and tube having the notch, the deflector defining a location where insertion of the tube into the bushing will begin, the one of the projection and notch on the tube being located such that just before the one of the notch and projection on the tube engages the other of the notch and projection on the bushing, said one of the notch and projection on the tube is moving away from the bushing flange.

* * * * *